United States Patent [19]

Holt et al.

[11] Patent Number: 5,198,188

[45] Date of Patent: * Mar. 30, 1993

[54] COMBUSTION SYNTHESIS METHOD AND PRODUCTS

[75] Inventors: J. Birch Holt, San Jose, Calif.; Michael Kelly, West Alexandria, Ohio

[73] Assignee: The United States of America as represented by the United States Department of Energy, Washington, D.C.

[*] Notice: The portion of the term of this patent subsequent to Jun. 12, 2007 has been disclaimed.

[21] Appl. No.: 641,977

[22] Filed: Jan. 16, 1991

[51] Int. Cl.⁵ .......................... B32B 9/00; B05D 1/00; B22F 1/00
[52] U.S. Cl. .......................... 419/45; 419/63; 419/35; 149/3; 149/5; 428/689; 428/697; 427/224; 427/377; 427/427; 427/446; 427/452; 501/94; 501/96
[58] Field of Search .................... 501/94, 96; 423/469, 423/509; 427/34, 423, 224, 377, 427; 419/10, 12, 45, 35, 63; 149/3, 5; 428/689, 697

[56] References Cited

U.S. PATENT DOCUMENTS

| 4,673,550 | 6/1987 | Dallaire et al. | 419/45 |
| 4,933,241 | 7/1990 | Holt et al. | 427/34 |
| 4,946,643 | 8/1990 | Dunmead et al. | 419/45 |
| 5,015,440 | 5/1991 | Bowden | 419/45 |

OTHER PUBLICATIONS

Schwarzkopf et al, *Refractory Hard Metals*, p. 6, 272-273, 1953.

Primary Examiner—Mark L. Bell
Assistant Examiner—C. M. Bonner
Attorney, Agent, or Firm—Henry P. Sartorio; Roger S. Gaither; William R. Moser

[57] ABSTRACT

Disclosed is a method of producing dense refractory products, comprising:
(a) obtaining a quantity of exoergic material in powder form capable of sustaining a combustion synthesis reaction;
(b) removing absorbed water vapor therefrom;
(c) cold-pressing said material into a formed body;
(d) plasma spraying said formed body with a molten exoergic material to form a coat thereon; and
(e) igniting said exoergic coated formed body under an inert gas atmosphere and pressure to produce self-sustained combustion synthesis.

Also disclosed are products produced by the method.

10 Claims, 3 Drawing Sheets

COMBUSTION SYNTHESIS METHOD AND PRODUCTS

The United States Government has rights in this invention pursuant to Contract No W-7405-ENG-48 between the U.S. Department of Energy and the University of California for the operation of the Lawrence Livermore National Laboratory.

BACKGROUND OF THE INVENTION

The present invention relates to a method of combustion synthesis, and to intermediate and final products obtained by the method. More particularly, the invention relates to a method of combustion synthesis for exoergic materials which involves use of a plasma spray of exoergic material to coat exoergic, formed green bodies prior to self-propagating high temperature combustion synthesis thereof. It also relates to exoergic green bodies formed during the process and to dense refractory materials formed as a consequence of the process.

Exoergic materials and structures produced therefrom have long been known in the art. Such materials contain all of the components necessary to sustain an exothermic reaction, in and of themselves. Thus, such materials can contain an oxidizing agent and an agent to be oxidized. Such materials can be ignited by suitable means to produce a self-propagating exothermic reaction and have applications as "one-shot" chemical heat sources.

Some exoergic materials, if the amount of exothermic heat released is sufficient, can be ignited in a known combustion regime known as "self-propagating high temperature synthesis" (SHS) or combustion synthesis. Preferably, such a combustion synthesis is carried out under pressure and results in a useful product, preferably a dense refractory material.

The amount of exothermic heat released during combustion synthesis depends upon the particular chemical system utilized. For example, the heat of formation of silicon carbide (SiC) from silicon and carbon powders is 300 cal/g; whereas the heat of formation for titanium diboride ($TiB_2$) from titanium and boron powders is 1200 cal/g. When the reaction has sufficient chemical energy to be conducted by combustion synthesis, the process is characterized by a rapidly moving combustion front and self-generated high temperatures in the product phase.

The use of a combustion reaction to synthesize a refractory material was first considered by Walton et al. [*J. Am. Ceram. Soc.*, 42(1): 40–49 (1959)] who produced a composite ceramic/metallic material using thermite reactions. In the late 1960's, A. G. Merzhanov and his colleagues began work on self-propagating combustion reactions which led to the development of a process which they called "self-propagating high temperature synthesis" (SHS). [See Merzhanov et al., *Dokl. Chem.*, 204 (2): 429–32 (1972): Crider, *Ceram. Eng. Sci. Proc.*, 3 (9–10): 538–554 (1982).]

Self-propagating high temperature synthesis (SHS), alternatively and more simply termed combustion synthesis, is an efficient and economical process of producing refractory materials. [See for general background on combustion synthesis reactions: Holt, *MRS Bulletin*, pp. 60–64 (Oct. 1/Nov. 15, 1987); and Munir, *Am. Ceram. Bulletin*, 67 (2): 342–349 (Feb. 1988).] The combustion reaction is initiated by either heating a small region of the starting materials to ignition temperature whereupon the combustion wave advances throughout the materials, or by bringing the entire compact of starting materials up to the ignition temperature whereupon combustion occurs simultaneously throughout the sample in a thermal explosion.

Advantages of combustion synthesis over prior art methods include: 1) higher purity of products; 2) low energy requirements; and 3) relative simplicity of the process. [Munir, supra at 342.] However, one of the major problems of combustion synthesis is that the products are "generally porous, with a sponge-like appearance." [Yamada et al., *Am. Ceram. Soc.*, 64 (2): 319–321 at 319 (Feb. 1985).] The porosity is caused by three basic factors: 1) the molar volume change inherent in the combustion synthesis reaction; 2) the porosity present in the unreacted sample; and 3) the evolution of adsorbed gases which are present on the reactant powders.

Because of the porosity of the products of combustion synthesis, the majority of the typical materials produced are powders or porous (40–60%) compacts. If dense materials are desired, the powders or compacts then must undergo some type of densification process, such as sintering or hot pressing. The ideal production process for producing dense SHS materials would combine the synthesis and densification steps into a one-step process.

Deposition of powdered materials onto substrates by the use of plasma guns has been known for many years. Exemplary patents are U.S. Pat. Nos. 3,387,110; 3,591,759; 3,676,638; 4,121,083; and 4,146,654. It is to be noted that many of these patents relate to plasma flame-spraying which is entirely nonanalogous to plasma spraying per se.

Although such plasma spraying techniques exist, conventional wisdom in the art has dictated that such techniques cannot be used in the formation of exoergic structures since exoergic materials would be expected to react violently, releasing large quantities of energy, in the plasma. Means of overcoming this problem is described in U.S. Pat. No. 4,806,384. In that patent is described a method of plasma spraying materials capable of self-propagating combustion synthesis onto various substrates.

The plasma spray technique is unsuitable, however, when the substrate itself is comprised of exoergic material because of the presence of absorbed water vapor on surfaces of the powders of the substrate. During subsequent combustion synthesis, the absorbed water vaporizes, creating a porous substrate and fracturing the coating applied by the plasma spray, resulting in defective products.

It would be desirable in the art to provide a method of making plasma sprayed exoergic materials which are dense, substantially non porous and whose exterior coatings are resistant to fracture.

SUMMARY OF THE INVENTION

It is an object of this invention to provide a method for producing structures of refractory materials from exoergic materials by the use of a plasma spray to coat an exoergic material on exoergic green bodies composed of powder reactants, wherein the exoergic coating materials are not reacted in the plasma. It is a further object of this invention to provide structures made by such methods. It is still further an object of this invention to make refractory materials of varying densities and shapes, preferably dense and preferably of net or near net shape.

Upon further study of the specification and appended claims, further objects and advantages of this invention will become apparent to those skilled in the art.

The present invention solves the problem of porosity of combustion synthesis products by a method which comprises first preparing a green body of exoergic materials free of absorbed gas, then coating the green body with a dense molten plasma spray of the same or different exoergic material, followed by ignition of the coated green body.

Because plasma spraying is a high temperature operation, any absorbed gases on the plasma reactants are removed in the hot plasma. The resulting coating comprises a high density, homogeneous mixture of the reactants. Rapid quenching of the powders upon impact with the green body, noncontact in the plasma flame, and short dwell times in the plasma, prevent the occurrence of a chemical reaction between or among the spray reactants. The reactants melt in the plasma prior to deposition. Deposition of the gas free reactants in the plasma spray upon a gas free exoergic green body eliminates two sources of porosity, i.e., initial porosity and absorbed gases, described above for combustion synthesis.

The plasma-formed body, i.e., spray coated green body, can take on various near net and net shapes from both simple to complex, ranging from flat or cylindrical compacts to hemispheres, spheres or other more complicated shapes created by the design of a mandrel or mold. The plasma-formed materials may be monolithic structures or single or multi-layered coatings.

The plasma-sprayed high density coating forms a barrier or container for the green body reactant materials. The plasma-coated green body is ignited preferably under an inert gas pressure whereupon a combustion wave rapidly sweeps through the materials transforming them into the product phase.

This inventive process differs from conventional (non-SHS) means of producing dense refractory materials of various shapes, such as hot-isostatic-pressing for the following reasons, among others: 1) the synthesis of the product occurs during combustion; 2) there is no need for a high temperature furnace since the chemical energy released in the process supplies the heat that is necessary for densifying the product; and 3) a barrier material, such as a metal canister or glass envelope, is not required since the reactant materials of the dense coating act as the canister.

A unique and salient aspect of this invention is that not only do the methods result in dense refractory materials, but also the materials are created in the shape required for the intended use. This feature is especially important in that dense refractory materials are very hard (for example, $TiB_2$ has a hardness comparable to diamond) and are therefore difficult to grind to the requisite shape. The methods of this invention result in refractory materials of near net or net shape.

The combustion synthesis of plasma-formed materials not only minimizes the porosity of the products, but also promotes their uniformity.

According to one aspect of this invention, the objects of this invention are obtained by providing a method of forming a refractory structure from reactive exoergic materials comprising:

(a) preparing a quantity of reactive exoergic materials in powder form capable of sustaining a combustion synthesis reaction;
(b) removing absorbed gases from said materials;
(c) pressing said materials into a formed body;
(d) plasma spraying the surface of said formed body with molten reactive exoergic materials to form a coated formed body; and
e) igniting said coated formed body to initiate a combustion synthesis reaction while under pressure.

The ignition and combustion synthesis reaction are preferably carried out in an inert gas atmosphere at a pressure of at least about 100 atmospheres. The resulting combustion synthesis product is a refractory material which is preferably uniform, but which can vary in density. Generally speaking, higher density products are achieved when higher pressures are used.

The refractory materials produced by the method of this invention preferably comprise one or more ceramic phases, an intermetallic phase, or a composite material comprising a ceramic and intermetallic and/or metallic phases. A preferred composite material is that comprising $TiB_2$ and Fe.

Preferred end stage refractory materials, i.e., those formed by the method of the invention, include borides, sulfides, selenides, aluminides and silicides. More preferred are borides that are selected from the group consisting of chromium, titanium, tantalum, hafnium, vanadium, zirconium and niobium borides. Further preferred are the borides selected from the group consisting of titanium, zirconium, hafnium and niobium borides. Still further preferred are the titanium borides, TiB and $TiB_2$, and most preferred is $TiB_2$.

BRIEF DESCRIPTION OF THE DRAWINGS

Various other objects, features, and attendant advantages of the present invention will be more fully appreciated as the same becomes better understood when considered in connection with the accompanying drawings, in which like reference characters designate the same or similar parts throughout the several views, and wherein.

DETAILED DISCUSSION

Definitions

The term "intermetallic" is herein defined to be a compound composed of two or more metals.

The term "dense" is used herein to denote a property of a material having a density which is greater than about 85% of theoretical, preferably greater than 90% of theoretical, more preferably greater than 95%, and still more preferably greater than 97% of theoretical and even more preferably greater than 99% of theoretical, wherein density is mass per unit volume. "Preferably" as herein used to define "dense" is used in a relative sense depending upon the particular application for which the refractory material is being prepared. In a general sense, materials that are less than approximately 90-95% dense have interconnecting porosity which can be open to the surface; such interconnecting and perhaps open porosity may be appropriate for certain insulative materials, but would not be appropriate for applications requiring a gas tight material.

The term "diluent" is used herein to denote a substance that is added to the reagents in the processes of this invention to drop the combustion temperature of the reaction; said "diluent" does not therefore produce heat during the combustion reaction; that is, it is effectively inert in the processes of this invention.

The term "dopant" is herein used to denote a substance added in small quantities (that is, approximately less than 5% by weight of the product) to the reagents in the processes of this invention to alter the properties of the product and/or the parameters of the process.

The term "formed body" refers to an object made by pressing exoergic materials in powder form into a desired configuration. The term is synonymous with the term "green body" which is also used herein.

"Arbitrary shape" is herein defined to mean any useful shape or structure, whether free-standing, a single or multilayered coating, or otherwise attached or appended, removably or irremovably, to a formed body, which is in various forms, whether symmetrical or unsymmetrical, which forms include but are not limited to spheres, hemispheres, rectangles, oblongs, ellipses and specific forms required for cutting tools, engine parts, structural components, injection nozzles and other useful parts.

The term "exoergic material" as used herein refers to materials which react to release relatively large quantities of energy and which are capable of sustaining a self-propagating combustion synthesis reaction.

Exemplary of such materials are Ti, B, C, Si, Ta, Al, Se, Zr, Mg, Ni, W, Cr, Hf, and mixtures thereof.

Preparing Formed Body

Figure 2:
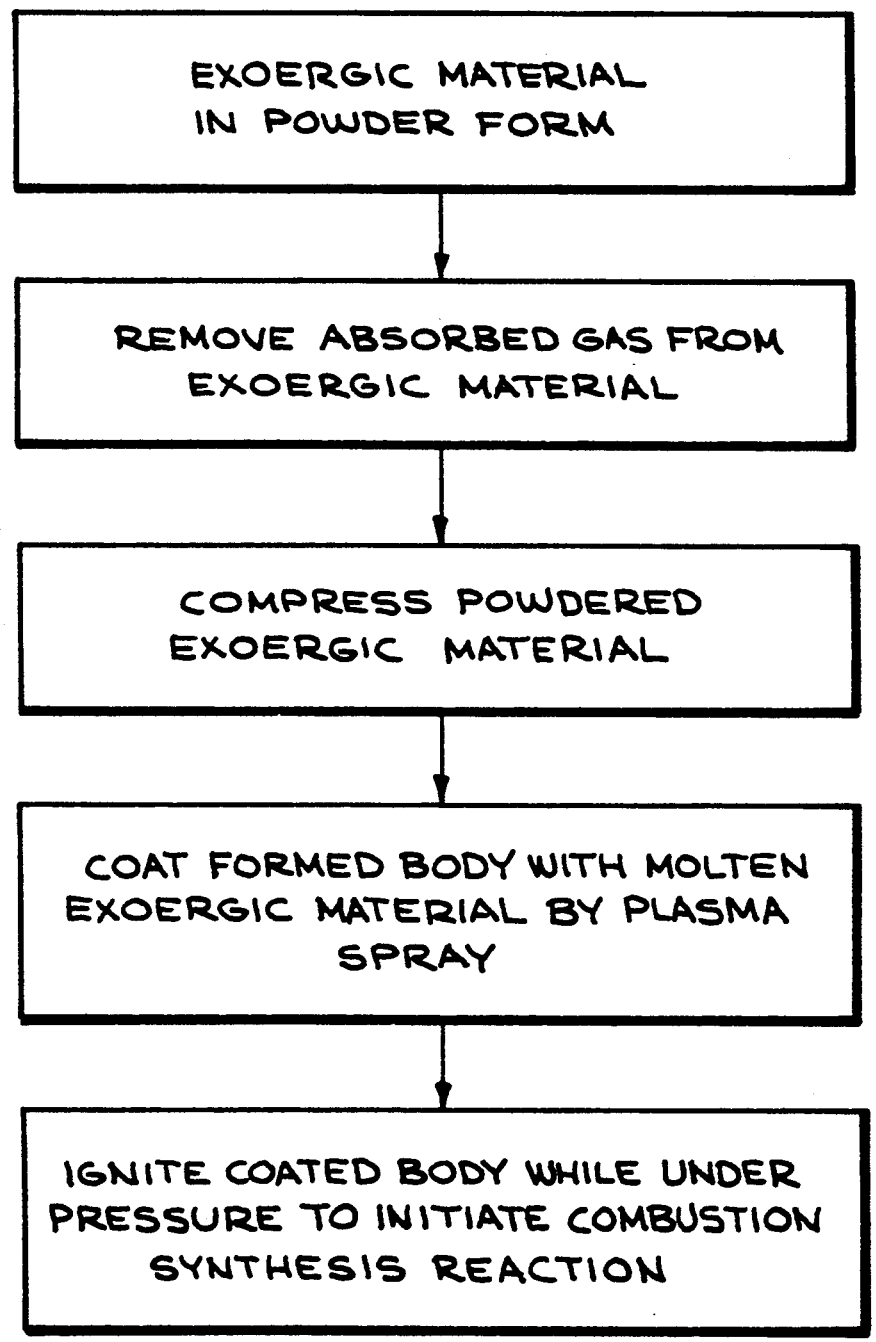
FIG. 2 is a block diagram illustrating the method of the invention.

In carrying out the method of the invention, referring specifically to FIG. 2, the first step (A) is to obtain a quantity of exoergic material in powder form. These materials are all commercially available or can be produced by known methods. After the desired material is obtained, the absorbed gases including water vapor are removed (B).

After the absorbed gases are removed, the powder is compressed (C) into a formed body of the desired size and shape. The formed body is then coated (D) with molten exoergic material by plasma spray, then ignited (E) in the manner described below.

In the practice of this invention, it has been found essential to remove absorbed gas from the powder because during the subsequent ignition step, the absorbed gas would vaporize and disrupt, break, or crack the coating applied to the formed body by the plasma spraying process; thus, defective parts would be the consequence. The powder can have the absorbed gases, primarily water vapor, removed by any suitable means. Preferably, however, removal of absorbed gas is achieved by subjecting the powder to a vacuum and heating it to a temperature of between about 300° to about 400° C. for a period of time sufficient to remove all of the absorbed gases. Generally, this takes about 60 minutes. The exact degree of vacuum, time and temperature will depend on the amount of material being outgassed, and the amount of absorbed gas present.

The water vapor can also be removed, if desired, by chemical means. For example, water vapor forms an oxide with boron if in contact a sufficient period of time. The compound formed is $B_2O_3$. This oxide can be removed by treating the oxide with methyl alcohol. Methyl alcohol dissolves the oxide, leaving pure boron intact.

Plasma Spraying

Figure 1:
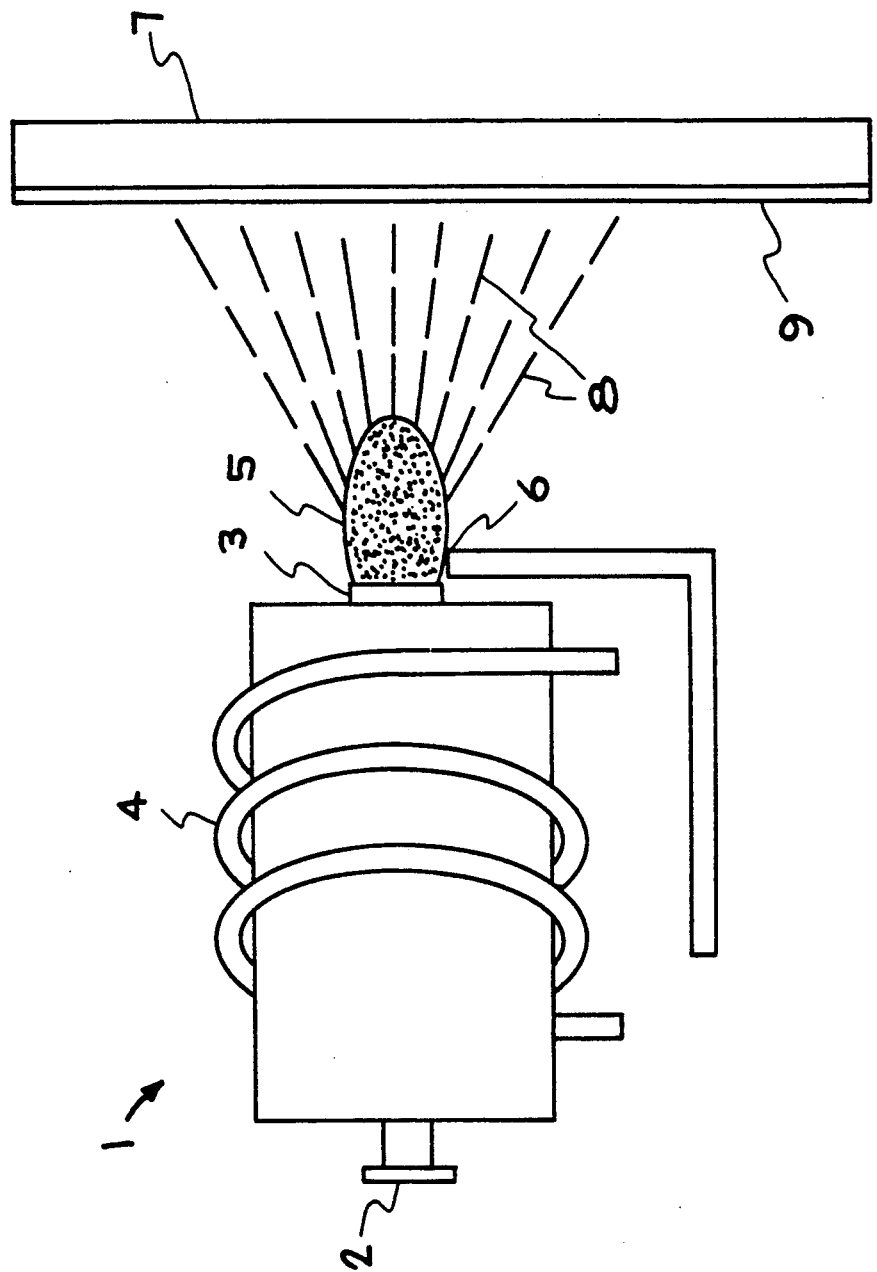
FIG. 1 is a schematic representation of a system for practicing the method of this invention.

In the system of FIG. 1, a plasma spray gun, designated generally as 1, is employed. The gun includes an inlet generally designated as 2 for a plasma-forming gas and an outlet generally designated as 3. The outlet comprises a plasma spray outlet which is fully conventional. The plasma spray gun includes fully conventional means for subjecting the plasma-forming gas to an amount of energy sufficient to form a plasma. This is accomplished by the use of fully conventional electrodes (not shown) and/or a radio-frequency coil 4. The electrodes are preferably positioned such that one is positioned downstream in the region of gas flow and the other is positioned upstream therein. When the plasma-forming gas is subjected to sufficient energy to form a plasma, the plasma exits the nozzle of the plasma spray gun and forms a plasma spray region 5. Reactive exoergic material can be introduced anywhere in the gas flow, e.g., at the inlet 2, etc. Preferably, the exoergic material is introduced in the plasma spray region at 6 by suitable means, e.g., a powder feed nozzle (not shown). A formed body 7 is positioned downstream of the plasma spray region.

In operation, suitable plasma-forming gas is introduced into the inlet of the plasma spray gun and is passed through the gun until it exits the plasma spray nozzle. The electrodes and/or radio-frequency coil are energized to initiate the plasma formation and form the plasma spray region. Exoergic material in finely divided particulate form is then introduced into the plasma spray region. In this region, the exoergic material becomes molten without chemically reacting and is propelled toward the formed body by the plasma flow. After exiting the plasma flow region, the molten particles 8 continue toward the formed body as a result of inertia and gas flow until they impinge on the formed body and solidify. The solidified particles 9 form a coat around the formed body 7, to produce a self-supporting, exoergic structure.

The formed body 7 is prepared as previously described by obtaining a quantity of exoergic material in powder form, removing water vapor and other absorbed gases or volatile components, then forming the powder into a green body, or formed body 7 as it is called herein.

Only materials that are capable of sustaining a combustion synthesis reaction resulting in a useful product are to be used for plasma spraying purposes. As outlined above in the Summary of the Invention, preferred refractory materials produced according to this invention include ceramics, intermetallics, and composite materials of ceramic and intermetallic and/or metallic phases. A preferred composite material is $TiB_2$ and Fe. Also preferred are borides, sulfides, selenides, aluminides and silicides. Especially preferred are the following refractory materials:

| Borides | Silicides | Sulfides | Selenides | Aluminides | Composites |
|---|---|---|---|---|---|
| $CrB_2$ | ZrSi | MgS | $WSe_2$ | NiAl | Al—$Fe_2O_3$ |
| $V_3B_2$ | $ZrSi_2$ | $MoS_2$ | ZrSe | CoAl | Al—NiO |

-continued

| Borides | Silicides | Sulfides | Selenides | Aluminides | Composites |
|---------|-----------|----------|-----------|------------|------------|
| VB | $Zr_2Si$ | $NbS_2$ | $MoSe_2$ | $Ni_3Al$ | $Al-Cu_2O$ |
| $VB_2$ | $Zr_5Si_3$ | $TaS_2$ | $NbSe_2$ | $Ni_2Al_3$ | $Al-SiO_2$ |
| $HfB_2$ | $MoSi_2$ | | $TaSe_2$ | | |
| $ZrB_2$ | $NiSi_2$ | | $TiSe_2$ | | |
| MoB | $TaSi_2$ | | | | |
| $NbB_2$ | TiSi | | | | |
| $TaB_2$ | $TiSi_2$ | | | | |
| TiB | $Ti_5Si_3$ | | | | |
| $TiB_2$ | | | | | |

Also preferred refractory materials produced according to this invention include CoAl, NiAl, NbGe, $Nb_5Ge_3$, $NbAl_3$, TiNi and $TiNi_2$.

In general, reactive exoergic materials (for example, titanium and boron powders) that are capable of sustaining a combustion synthesis reaction require a feed rate which is from about 10–20 grams per minute.

Preferred particle sizes for plasma spraying are in the range of from 220 to 325 mesh.

Suitable plasma-forming gases include argon and helium and mixtures of argon and hydrogen, most preferably plain argon. Oxidizing gases such as oxygen are not acceptable. Argon is a preferred plasma-forming gas. Gas feed rates are typically 40–60 cubic feet per hour.

The electrodes of the plasma torch require 350–800 amperes, preferably 600–800 amperes, at 24–58 volts. The temperature of the plasma is typically 15,000°–30,000° C. In this aspect of the invention the total system can be in an ambient pressure environment or in a slight vacuum environment.

The particles are typically fed into the hot region of the plasma. The powders melt in the plasma without any apparent chemical reaction and are transported by the gas flow in the plasma onto a target formed body which preferably is from about 3 to 10, more preferably about 9 inches from the front of the plasma gun nozzle. Upon contact with the relatively cool surface of the formed body, the molten powders very rapidly solidify to a dense structure. Although the known reaction ignition temperatures of the above-identified exoergic mixtures are lower than either the typical temperature of the plasma or the known melting points of the constituents of the mixtures, no reaction occurs because the dwell time of the powders in the plasma region is extremely short. Typical dwell times are on the order of a few microseconds, for instance not more than 500 microseconds. The dwell times must be long enough for the powders to melt but short enough so that no reaction occurs. Preferably, the plasma conditions are such that minimum particle-to-particle contact occurs, which contributes to the melting of the powder without chemical reaction.

Thin-walled, rigid, high-density exoergic coatings applied to formed bodies of various geometries result. Typical wall thicknesses of the coatings are 0.1 cm to 0.25 cm.

The formed body 7 can be formed of any of the aforedescribed exoergic materials. Preferably, both the formed body and the plasma sprayed exoergic materials are the same. This is not absolutely essential, however. Thus the formed body can be prepared from one type of exoergic material and the coating applied with the plasma spray from another. The choice of shapes of the formed body is unlimited. Thus, targets can be in the form of flat plates, cylinders, spheres, or any other shape. The orientation of the target in relation to a conventional argon plasma device is shown in FIG. 1.

The surface of the exoergic coated formed body structure can be plasma sprayed with insulative and protective coatings, if desired. An insulator such as $ZrO_2$ can be used to direct the heat flow during the thermitic reaction, and various metals can be applied as protective coatings.

Figure 4:
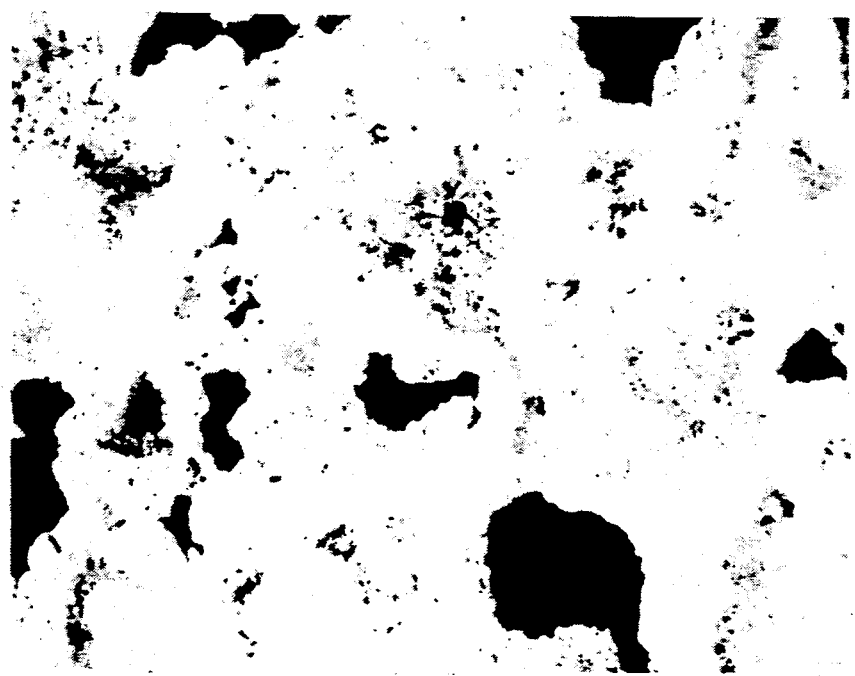
FIG. 4 is a micrograph which illustrates the refractory materials produced according to this invention.
Figure 3:
FIG. 3 is a micrograph of a typical plasma formed part, at 500X magnification, produced in accordance with the method of the invention.

The microstructure of typical plasma-formed parts are shown in FIGS. 3 and 4. The parts were prepared from a formed body of TiB powders, which had been outgassed. The formed bodies were plasma sprayed with a Ti and B mixture, then ignited at 1500° C. while under a pressure of 30,000 psi.

Combustion Synthesis of Plasma Sprayed Materials

The aspect of this invention concerning the combustion synthesis of the coated formed body comprises the simultaneous synthesis and densification of the refractory product into a near-net or net shape. Initially, as outlined according to the parameters above, the materials, for example, Ti and B, are plasma sprayed in appropriate stoichiometric amounts onto any arbitrary, desired formed body. The resulting exoergic structure, comprising the unreacted exoergic materials coating the unreacted exoergic formed body has a low porosity (about 1% to 10%).

If a dense refractory material is desired, for example, that is, about or greater than 85% dense, preferably greater than 90% dense, more preferably greater than 95% dense, still more preferably greater than 97% dense, the ignition of the plasma sprayed materials is performed under an inert gas pressure wherein, in general, the higher the gas pressure, the more dense the product. Preferred pressures are greater than 100 atm and less than about 4000 atm, more preferably in the range of from about 500 atm to about 4000 atm, still more preferably from about 1000 atm to about 3000 atm, and even more preferably from about 1500 atm to about 2500 atm. For a particular chemical system, a preferred pressure range could be found within such ranges if a fully dense product, that is, greater than 99% dense, is desired.

The inert gas used for applying pressure in a pressure vessel such as an autoclave would include He and Ar, preferably argon.

The source of ignition for the combustion synthesis processes of this invention is not critical. Any source providing sufficient energy for ignition would be suitable. Exemplary methods include sources such as laser beams, resistance heating coils, focused high intensity radiation lamps, electric arcs or matches, solar energy, thermite pellets among other sources. A tungsten coil is a preferred ignition means.

The nature and composition of the product phases can be controlled by varying the ratios of the starting reagents, the level of inert gas pressure, by adding diluents and/or dopants, and by other methods apparent to those of ordinary skill in the art from the instant disclosure. By varying the combustion synthesis parameters, the properties of the product can be tailored to meet specific application needs.

It should be understood by those skilled in the art that prior to combustion the plasma sprayed coating on the formed body is more dense than the body itself. During combustion the formed body densifies and shrinks somewhat. The coating shrinks along with the formed body and thus adheres closely to the surface of the formed body. During combustion, a bond forms between the coating and the body, thus producing a single dense integral structure.

Applications of the refractory materials of arbitrary shape produced according to the methods of this invention include their use as cutting tools, wear parts, electrodes of different shape, high temperature crucibles, armor, injection nozzles for coal-fired diesel engines, structural components, among other uses. Some uses to which the refractory materials produced according to this invention can be applied, may not demand as high a density as others. For example, materials used for filters, industrial foams, insulation, and crucibles, may not be required to be as dense as materials used for armor or abrasive and wear resistant materials. Therefore, the use to which the refractory material is to be applied can be determinative of the conditions of synthesis that would be optimal from an efficiency and economy standpoint. For example, if the material need only be 90% dense rather than 95% dense, less pressure could be applied, resulting in energy savings.

It is preferred that (if appropriate according to heat capacities of the product) any diluents that are to be plasma sprayed and combusted with the reactive exoergic materials according to this invention be pre-reacted components of the refractory product.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

EXAMPLE 1

A particulate powder is formed by mixing a quantity of Al and $Fe_2O_3$ together in 1:1 molar ratios. The powder is placed in a vacuum chamber and heated to a temperature of 300° C. All volatile gases, including water vapor, are removed.

Thereafter, the powder is placed in a mold and pressed into a cylinder. The cylinder is then placed on a stage in front of the barrel of a plasma spray gun. Argon gas is introduced into the plasma spray gun at the rate of 40 standard cubic feet/hour. A current of 600–800 amps is applied to the electrodes of the gun to form a plasma directed to, but not impinging upon, the cylinder. Aluminum and $Fe_2O_3$ having a particle size between 270 mesh and 325 mesh are simultaneously introduced into the plasma feed gas at a gas flow rate of 10–45 standard cubic feet/hour. An exoergic coating is formed on the cylinder.

The coated compact is then subjected to a pressure of 30,000 psi, and heated to a temperature of 450° C. in an inert atmosphere, at which temperature the coated compact is ignited. After combustion, the density is measured and found to be 97% of theoretical.

EXAMPLE 2

The procedure of Example 1 is repeated, except that the compact is coated with a plasma spray of Al. The plasma coated compact, after combustion, has a density of 97% of theoretical.

EXAMPLE 3

A compact is prepared in accordance with the procedure of Example 1 by mixing stoichiometric ratios of Ti and B, removing entrapped gases therefrom, and then coating the compact with a plasma spray of $TiB_2$ having a particle size of between $15\mu$ and $40\mu$.

The coated compact is then subjected to a pressure of 30,000 psi, and simultaneously heated to a temperature of 1500° C., whereupon ignition occurs. After combustion is complete, the product has a density of 94% of theoretical.

EXAMPLE 4

The procedure of Example 3 is repeated except that the compact is coated with Al, rather than $TiB_2$. In all other respects, the procedure is the same. The combusted product has a density which is 94% of theoretical.

In the foregoing examples, ignition of the coated compacts was achieved by heating them to a temperature at which combustion occurred. Combustion can also be initiated by use of a tungsten coil or other ignition device.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A method of producing combustion synthesis products which comprises:
   (a) obtaining a quantity of exoergic material in powder form capable of sustaining a combustion synthesis reaction;
   (b) removing absorbed water vapor therefrom;
   (c) cold-pressing said material into a formed body;
   (d) plasma spraying said formed body with a molten exoergic material capable of being rendered molten to form a coat thereon; and
   (e) igniting said exoergic coated formed body under an inert gas atmosphere and pressure to produce self-sustained combustion synthesis.

2. A method according to claim 1 wherein said exoergic coated formed body is ignited under an inert gas pressure greater than 100 atm and less than about 4000 atm.

3. A method of producing dense refractory materials which comprises:
   (a) obtaining a quantity of exoergic material in powder form capable of sustaining a combustion synthesis reaction;
   (b) removing absorbed water vapor therefrom;
   (c) cold-pressing said material into a formed body;
   (d) plasma spraying said formed body with a molten exoergic material to form a coat thereon; and
   (e) igniting said exoergic coated formed body under an inert gas atmosphere and pressure to produce self-sustained combustion synthesis.

4. A method according to claim 3 wherein the ignition is carried out under an inert gas pressure of from about 1000 atm to about 3000 atm.

5. A method according to claim 4 wherein the pressure is from about 1500 atm to about 2500 atm.

6. A method of producing a shape dense refractory material comprising:
   (a) obtaining a quantity of exoergic material in powder form capable of sustaining a combustion synthesis reaction;
   (b) removing absorbed water vapor therefrom;
   (c) cold-pressing said material into a formed body;
   (d) plasma spraying said formed body with a molten exoergic material to form a coat thereon; and
   (e) igniting said exoergic coated formed body under an inert gas atmosphere and pressure to produce self-sustained combustion synthesis.

7. A method according to claim 6 wherein the ignition is carried out under an inert gas pressure of from about 1000 to about 3000 atm.

8. A method according to claim 7 wherein the pressure is from about 1500 atm to about 2500 atm.

9. A method for preparing an encapsulated refractory green body which comprises:
   (a) obtaining a quantity of exoergic material in powder form;
   (b) degassing said exoergic material;
   (c) pressing said material into a formed body; and
   (d) coating said formed body with a molten exoergic material by means of a plasma spray to a depth ranging from about 0.1 cm to about 0.25 cm.

10. An encapsulated refractory green body which comprises a formed body of exoergic material in powder form capable of sustaining a combustion synthesis reaction, said body having a coating of exoergic material capable of sustaining a combustion synthesis reaction deposited thereon in molten condition by means of a plasma spray, said coating ranging in depth from about 0.1 cm to about 0.25 cm.

* * * * *